United States Patent [19]
Fletcher et al.

[11] 3,833,322
[45] Sept. 3, 1974

[54] APPARATUS FOR FORMING DRIVE BELTS

[76] Inventors: James C. Fletcher, Administrator of the National Aeronautics and Space Administration with respect to an invention of; Albert Topits, Jr., Altadena, Calif.

[22] Filed: Aug. 31, 1973

[21] Appl. No.: 393,525

[52] U.S. Cl. .................................. 425/28 B, 425/35
[51] Int. Cl. ......................... B29h 7/22, B29d 29/00
[58] Field of Search .......... 425/28 B, 29, 30, 31, 32, 425/33, 34 B, 35, 40, 43

[56] References Cited
UNITED STATES PATENTS

| | | | |
|---|---|---|---|
| 2,459,295 | 1/1949 | Skoog............................ | 425/28 B X |
| 2,587,119 | 2/1952 | Davis et al. ...................... | 425/28 B |
| 3,085,287 | 4/1963 | Wach............................... | 425/35 X |
| 3,477,895 | 11/1969 | Sauer .............................. | 425/28 B |
| 3,700,365 | 10/1972 | Spicer et al. ..................... | 425/28 B |

*Primary Examiner*—J. Howard Flint, Jr.
*Attorney, Agent, or Firm*—Monte F. Mott; Paul F. McCaul; John R. Manning

[57] ABSTRACT

An apparatus for manufacturing belts, such as seamless belts, is provided having relatively movable rollers that are mounted in an oven. A belt blank, for example, of a thin polyester film, is rotated on the rollers as heat is applied. Four rollers, each mounted on a separate roller assembly, are movable along appropriate tracks while a fifth centrally located roller is stationary. A pair of DC motors are operatively connected to a speed reduction gear assembly to provide a pair of rotating drive shafts that extend into the oven. One rotating shaft drives all of the rollers through a rotational gear assembly while the other drive shaft is capable of positioning the movable rollers through respective rotating threaded shafts. Control devices are provided for controlling the motors while measuring devices are operatively connected to the positional drive shaft to indicate the position of the rollers.

15 Claims, 5 Drawing Figures

APPARATUS FOR FORMING DRIVE BELTS

BACKGROUND OF THE INVENTION

1. Origin of the Invention

The invention described herein was made in the performance of work under a NASA contract and is subject to the provisions of Section 305 of the National Aeronautics and Space Act of 1958, Public Law 85-568 (72 Stat. 435; 43 U.S.C. 2457).

2. Field of the Invention

The present invention is directed to an apparatus for manufacturing drive belts and more particularly, to an apparatus for manufacturing precision seamless belts.

3. Description of the Prior Art

Recent work on rotary mechanisms such as tape reels, capstans, and speed reduction systems in high precision tape transports and other equipment have required a high quality transmission belt to provide the utmost reliability and stability. To meet the high performance characteristics of these tape transports or recorders, there is a demand for seamless belts with a relatively uniform longitudinal elasticity.

Particularly, in the field of satellites and space probes, tape recorders require high quality transmission belts having a minimum weight to insure maximum reliability. Obviously, where maintenance is not possible, or impractical, it is essential to provide the optimum designed belt for reliability.

To facilitate an understanding of the precise nature and size of these drive belts, it should be realized that the belt blank is generally cut from a thin polyester material such as a mylar sheet having a thickness in the range of 0.0005 to 0.004 inches wide. The actual shape of the blank will vary depending on the desired finished belt. Frequently, the blank would be cut to specifically pre-compensate for any stress existing in the mylar sheet. For example, the blank could have an off-center shape with the thickness of the blank varying symmetrically from a maximum width through a minimum width to finally a maximum width over a 180° arc. This cyclic shape repeats itself to form the closed ring blank. The thinner the belt, within the desired strength requirement, the less bending stress it will experience and accordingly, it will have longer life. Thicker belts also require a greater tension in the belt to conform the belt to the crown pulleys. The greater tension places the bearing of the shafts under undesired stress.

Quite frequently, it has been required to trim the edges of the manufactured seamless belt to produce the desired result. This trimming operation creates a problem of both stress and potentially flawed jagged edges.

The apparatus utilized for forming belts were frequently a two roller machine with heat applied to the belt blank as it was rotated on the rollers. One of the machine rollers was stationary and the other roller was longitudinally movable. To accommodate relatively large belts, long narrow ovens or heaters were required to provide the necessary longitudinal movement of the roller.

The Rockoff et al, U.S. Pat. No. 2,991,498 (1961) is cited to merely disclose a pair of rollers that are relatively movable to accommodate a conventional heavy duty V-shaped belt. A heater block is placed intermediate of the rollers to seal the exposed cored edges from unraveling.

OBJECTS AND SUMMARY OF THE INVENTION

It is a primary object of the present invention to provide an apparatus for manufacturing precision belts that have a high degree of reliability during their service life.

It is another object of the present invention to provide an apparatus for manufacturing seamless belts from thin polyester belt blanks.

It is a further object of the present invention to provide an apparatus with relatively movable rollers that can process a wide variety of belt sizes.

It is yet another object of the present invention to provide an apparatus that includes a precise control of the rotation and positioning of the rollers.

It is yet a further object of the present invention to provide rollers that will permit a controlled application of heat to the belt blank.

Briefly described, the present invention involves a plurality of rollers that are controllably movable and adapted to rotate a belt blank in a heated environment. A stationary roller is centrally located and increases the range of belt sizes that can be processed.

More particularly, the subject invention includes a mounting base plate that supports on one side a rotational gear assembly for rotating each roller and on the other side a positional gear assembly for precisely positioning each roller along diagonally positioned tracks. A pair of DC motors connected to a speed reduction gear box drives power shafts respectively connected to the rotational and positional gear assembly. The positional gear assembly includes a series of threaded shafts and journaled collars for positioning the roller assemblies that carry the rotating rollers. The rotational gear assembly drives the rollers through a series of longitudinally slotted shafts having gears keyed to a respective shaft. Appropriate controls are provided for the DC motors while measuring devices provide an indication of the roller positions.

Further objects and the many attendant advantages of the invention may be best understood by reference to the following detailed description taken in conjunction with the accompanying drawings in which like reference symbols designate like parts throughout the figures thereof.

DESCRIPTION OF THE PREFERRED EMBODIMENT

Figure 1:
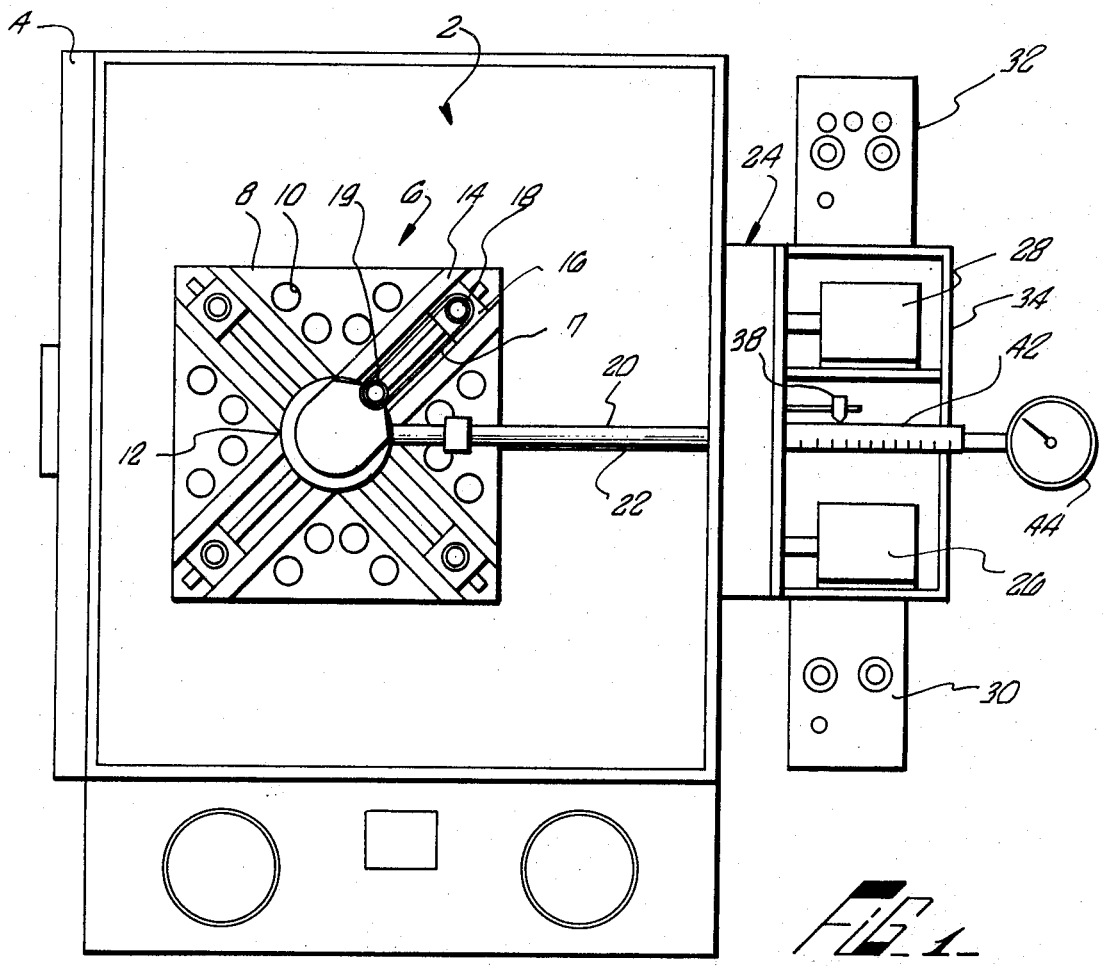
FIG. 1 is a schematic illustration of the present invention with a rotating belt blank.

Referring to FIG. 1, a schematic embodiment of the present invention appropriately mounted in a heating unit such as an oven 2 is disclosed. The oven door 4 is in an open position. The oven 2 can be a STABIL-THERM constant temperature cabinet made by the Blue M Electric Company of Blue Island, Illinois. If necessary, this particular oven can be modified by the installation of additional heating elements to insure an adequately fast heating rate.

The heating rate is particulary important for uncrystallized polyester film belt blanks since their particular shrink behavior will depend on the heating rate. Uncrystallized as used herein, designates the state or condition of a polyester plastic material that has not been subjected to heat treatment and is therefore still thermoplastic. A polyester plastic is generally not crystalized until it has been heat treated to a temperature over 200° C. Generally, the belt blanks utilized on the present apparatus are cut from polester film which will exhibit thermoplasticity in the temperature range of 70°C to 90°C. Sheets of this polyester material are referred to as uncrystallized biaxially oriented (or shrink) film and are available with a uniform modulus of elasticity in all directions in the plane of the film. The present invention is, of course, applicable on other forms of belt blanks whether crystallized or not.

In addition, the heating rate is directly related to the belt processing time and the efficiency of the belt forming procedure. While not shown, a circulating fan can be housed within the interior of the oven to assist in cooling the oven and regulating the heat transfer rate to the belt blank.

To appreciate the nature of the material that is processed by the apparatus of the present invention, a brief description of one form of a belt forming procedure is provided. The procedure begins with a sheet of modulus balanced uncrystallized polyester film.

The polyester or film sheet is placed on a horizontal rotatable table covered with an elastomer and beneath a cutting heat. The polyester sheet can be held in place by pre-coating the elastomer with distilled water. When all the bubbles re squeezed out from between the film and the table surface, the surface tension of the water is sufficient to hold the polyester sheet in place and in a non-stress condition while the blank is being cut. Two concentric cuts are made to form the belt blank.

While the particular operational steps of forming a belt from a particular type of material will vary depending upon the material and design characteristics, it has been found that it is possible to eliminate the trimming process while accommodating belts of a large number of sizes with the apparatus of the present invention. If a polyester of an uncrystallized state is utilized for the belt blank, a highly desirable seamless belt utilizing a heat shrinking process can be produced requiring no finishing steps. However, even with belt blanks formed from polyesters having variances in the amount of elasticity due to heat treatment of the polyester sheet, it is possible for the present apparatus to provide a belt that requires only a nominal amount of trimming to remove any ripple or wrinkles that exist on the edges of the belt.

Basically, the present invention can be bifurcated into two parts; the first part includes the motors and controls mounted outside an oven 2 to be discussed subsequently and the second part includes a roller mechanism 6 positioned in the oven 2 for mounting a belt blank 7. Basically, the roller mechanism 6 includes a mounting base plate 8 supported or suspended within the oven 2. The mounting base plate 8 has circular holes or bores 10 to provide both a lessening of the weight and mass of the mounting base plate 8 and to facilitate the cooling of the base plate 8.

Centrally mounted on the mounting base plate 8 is a dual transmission assembly 12. Radiating outward from the dual transmission assembly 12 are four sets of tracks 14 with each track set operatively supporting and guiding a roller assembly 16. Since each quadrant of the mounting base plate 8 contains an identical roller assembly 16 and a set of tracks 14, the present description will be limited as disclosed in the figures to only one quadrant of the roller mechanism 6.

Basically, each roller assembly 16 is designed to provide a rotating hollow roller 18 which is radially movable along the axis of its appropriate tracks 14. Each roller assembly 16 includes a pair of brass guide rails (not shown) that engage the tracks 14. The rollers 18 are hollow to facilitate both quick cooling and heating thereby eliminating any heat sinks that could damage the belt blank 7 by transferring excessive heat. Each of the roller assemblies 16 are positioned radially along the tracks 14 at the same distance from the center of the dual transmission assembly 12.

Connected to the dual transmission assembly 12 are a pair of rotating power shafts 20 and 22 that extend respectively from a speed reduction gear box 24 that is mounted outside of the oven 2. A power supply such as a pair of DC motors 26 and 28 appropriately mounted in a housing 34 are respectively connected to the shafts 20 and 22 through the speed reduction gear box 24 to be discussed subsequently in detail with respect to FIG. 5. A DC motor 26 is utilized to rotate the rollers 18 through the speed reduction gear box 24 and the power shaft 20. DC motor 28 radially positions the rollers 18 along their tracks 14 through the speed reduction gear box 24 and the power shaft 22. Other forms of power means can be utilized in the present invention. An appropriate speed control device 30 controls the output of the DC motor 26. Likewise, an appropriate position control device 32 controls the output of the DC motor 28. Standard control dials such as forward, brake, reverse, on, off, are provided for the operator. An appropriate control device for controlling both the position and rotation speed of the rollers 18 is manufactured by the Bodine Electric Company and marketed as a TYPE ASH 201 DC MOTOR CONTROL EXTENDED RANGE.

Figure 5:
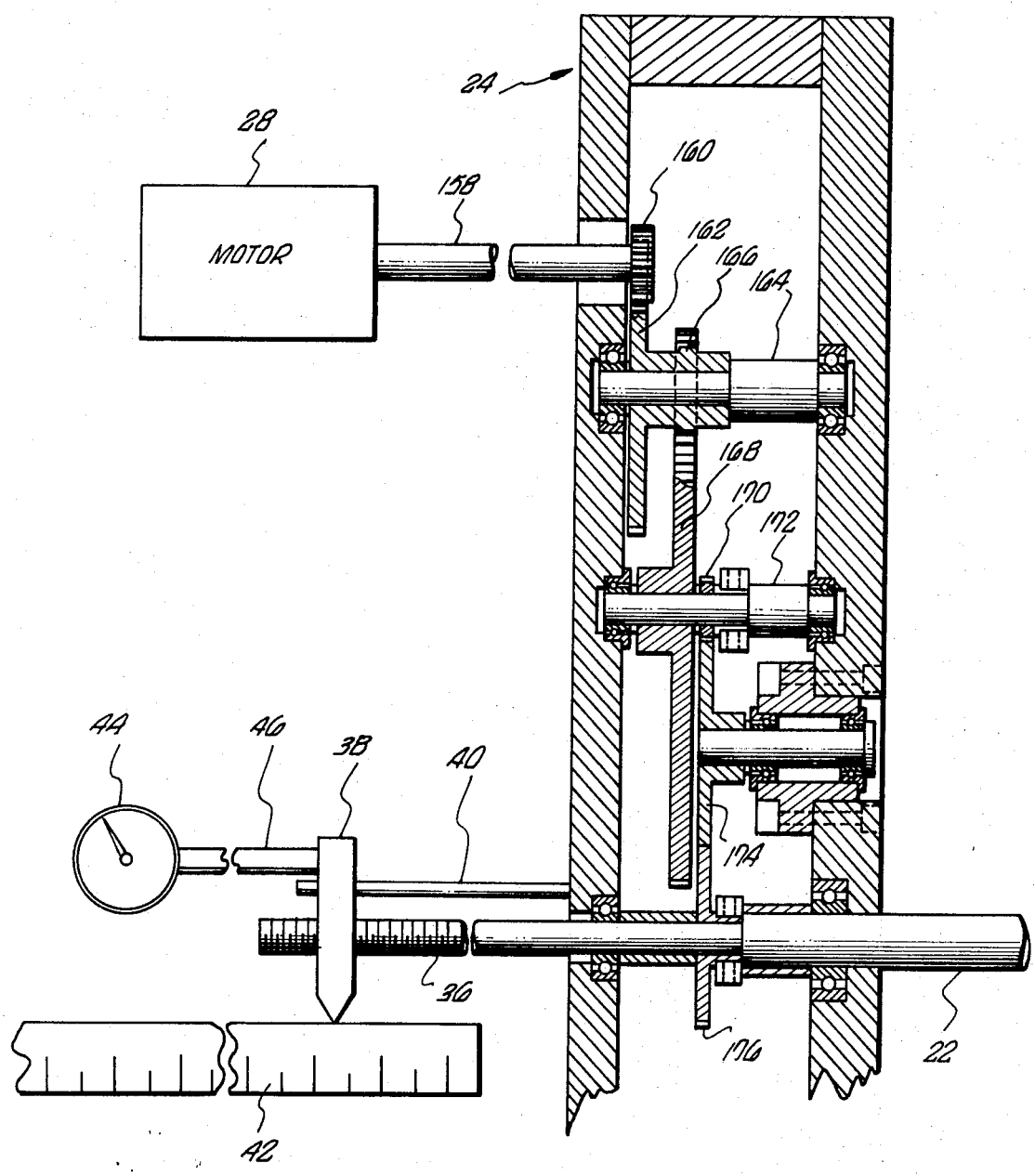
FIG. 5 is a cross sectional view of the speed reduction gear box and the measuring devices of the present invention.

Referring to FIG. 5, a threaded indicator shaft 36 extends from the speed reduction gear box 24 and rotates at the same speed as the position power shaft 22. The shaft 36 extends into the mounting housing 34. Mounted on the threaded shaft 36 is a pointer member 38 that has an appropriately threaded bore in its body. The pointer member 38 also has an appropriate bore for accommodating a smooth alignment shaft 40 which permits the pointer member 38 to move along the threaded shaft 36 in response to the rotation of the shaft 36. A linear indicator 42 such as a Vernier gauge discloses the relative displacement of the pointer member 38 along the threaded shaft 36. This displacement on the linear indicator 42 is directly proportional to the actual radial displacement of the rollers 18 along their tracks 14. To insure accuracy in positioning the rollers 18, a second measurement device such as a dial gauge indicator 44 having a positioning shaft 46 can be operatively connected to the pointer member 38 as shown in FIG. 5.

Figure 3:
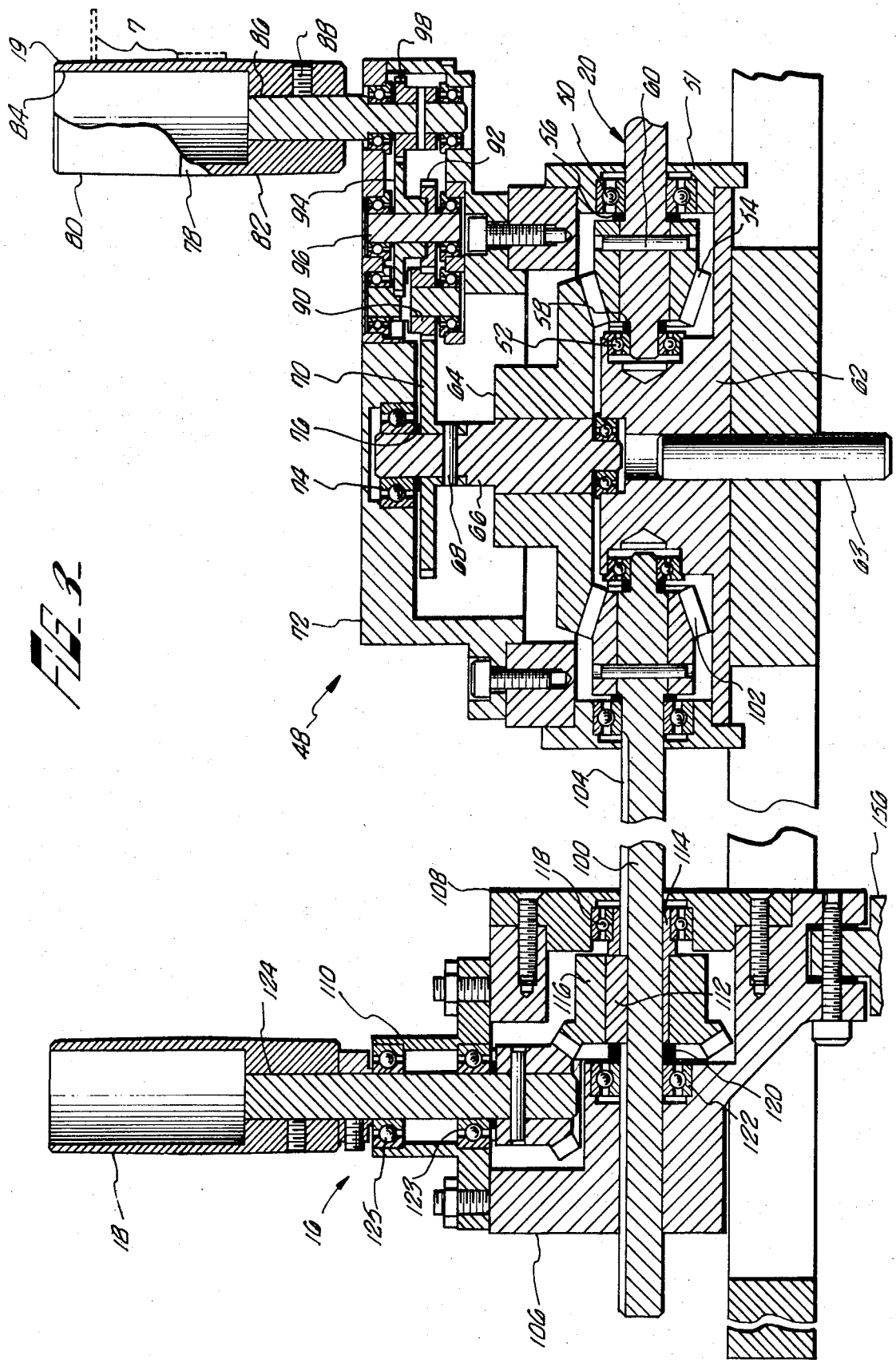
FIG. 3 is a cross sectional view of the rotational gear assembly.

Referring to FIG. 3, a rotational drive assembly 48 is disclosed connected to the power shaft 20 and having an outer housing 72. The power shaft 20 is journaled within a pair of bearings 50 and 52 and connected intermediate of the bearings to a bevel gear 54. A cover plate 51 forming part of the outer housing 72 supports bearing 50. A mounting member 62 supports the other bearing 52. A pair of spacers 56 and 58 are attached to the power shaft 20 between the bevel gear 54 and the respective bearings 50 and 52 to maintain the alignment of the bevel gear 54. A locking pin 60 fastens the bevel gear 54 to the power shaft 20. The mounting member 62 provides not only a seat for the bearing 52 but for other bearings subsequently to be discussed. The mounting member 62 is aligned and fastened to the base plate 8 by a dowel pin 63.

A main drive bevel gear 64 is press-fitted onto a shaft 66 which is connected by a locking pin 68 to a first gear 70. The outer housing member 72 protects the drive bevel gear 64 and mounts a bearing 74 for the shaft 66. A spacer 76 is positioned between the first gear 70 and the bearing 74. As disclosed in the drawing, the outer housing member 72 is appropriately fastened to the mounting member 62 which in turn is appropriately fastened onto the mounting base plate 8. The mounting can be accomplished by conventional fasteners known in the prior art which need not be enumerated herein. The outer housing member 72 is designated to include all the subpieces, such as cover plate 51, which form the outer shell or housing about the drive bevel gear 64.

The arrangement of bearings and spacers for each of the subgears to be subsequently discussed are operatively arranged in the same manner previously disclosed with regard to the bevel gear 54 and accordingly, a detailed description is unnecessary.

The useful power produced by the drive bevel gear 64 is transmitted through the shaft 66 to the first gear 70 to ultimately rotate a stationary roller 19 that is offset from the radial center of any geometrical circle that would include each of the rollers 18. This off-set location of the roller 19 is provided specifically to increase the versatility of the present invention by increasing the applicable range of belt sizes that can be accommodated on the present invention. In particular, as can be seen from FIG. 1, the off-set location of roller 19 permits small belts to be processed due to the capability to position one of the rollers 18 relatively close to the stationary roller 19.

Roller 19 has the same configuration as the other rollers 18 and as can be seen from FIG. 3, comprises a centrally flat section having tapered or conical side sections 80 and 82 respectively. The relative angle of the taper has been exaggerated in FIG. 3 and in reality generally consists of approximately a half of a degree relative to the central flat section 78. The roller 19 is hollow with a central bore 84 to facilitate both quick cooling and heating of the belt blank. A solid roller would provide a reservoir of heat energy that could be easily transmitted to the belt blank 7 through surface contact. Thus, a solid roller would have the potential of a higher rate of heat transfer both during the heating period and the cooling period during the formation of the belt. Generally, the belt will straddle the roller's central flat section 78 and overlap the tapered sides in its finished state. The roller 19 is mounted on a shaft 86 and is held in place by a set screw 88. The roller 19 is rotated through a series of gears in which the first gear 70 drives a second gear 90 which in turn meshes with a third gear 92 to drive a fourth gear 94 mounted on the same shaft 96 as the third gear 92. The fourth gear 94 drives the roller gear 98 mounted on the roller shaft 86. The particular gears can be mounted on their respective shafts by either locking pins as described before or by a press-fit.

The drive bevel gear 64 receives driving power through the power shaft 20 and its attached bevel gear 54 and transmits that power to drive four sets of power shafts which in turn drive their respective rollers 18. Since each of the roller assemblies 16 are identical, only one quadrant of the roller mechanism 6 will be described with the understanding that the description applies to each of the respective roller assemblies 16.

A longitudinally slotted power shaft 100 radiates outward from the housing member 72. Operatively connected to the shaft 100 is a bevel gear 102. The connection of the gear 102 to the shaft 100 and the use of spacers and bearings is similar to the description pertaining to the bevel gear 54 and accordingly, it is not necessary to elaborate on these features. The power shaft 100 has a relatively rectangular slot 104 which extends to the end of the shaft 100. The roller assembly 16 includes an outer housing 106 that is adapted to surround the power shaft 100. A front cover plate 108 is part of the outer housing 106 and has an appropriate aperture for receiving the power shaft 100. The outer housing 106 is radially positioned relative to the rotational drive assembly 48 along the power shaft 100. The particular means by which the outer housing 106 is positioned will be described in more detail with respect to FIG. 4. Basically, FIG. 3 is directed to a disclosure of the rotational drive of the rollers 18.

The slotted power shaft 100 is adapted to receive a rectangular key 112 which in turn fits within a brass sleeve 114 that is adapted to slide with the key 112 along the slotted power shaft 100. Mounted on the brass sleeve 114 is a bevel gear 116 that rotates in unison with the power shaft 100 by virtue of the interlocking key 112. An appropriate bearing 118 seats on the front cover plate 108 and the shoulder of the brass sleeve 114. An appropriate spacer 120 and bearing 122 are provided between the outer housing 106 and the bevel gear 116.

The roller 18 which is physically similar to the described roller 19 is mounted on a shaft 124. The shaft extends through a top cover plate 110 which supports appropriate bearings 123 and 125. The shaft 124 is connected to a bevel gear 126 that meshes with the bevel gear 116 of the power shaft 100. Accordingly, the roller 18 can be rotated by the power output of the shaft 100 at any point along the longitudinal length of the power shaft 100. Each of the other rollers 18 will be rotated at the same speed during a belt forming operation.

Figure 2:
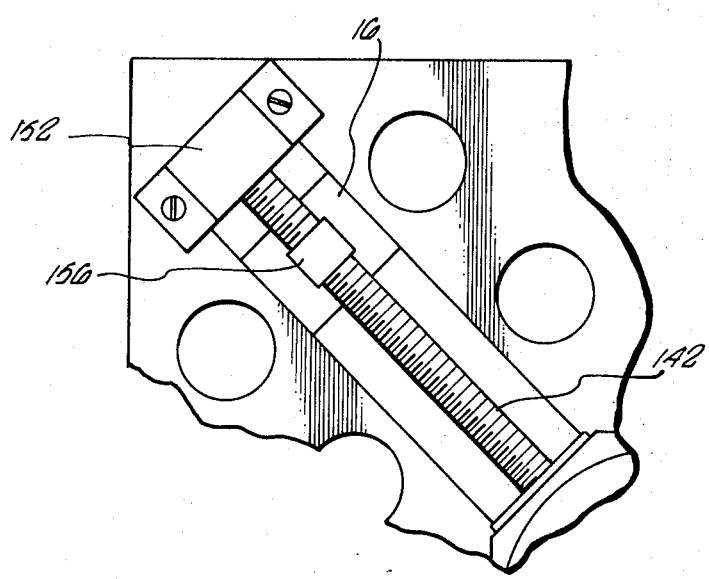
FIG. 2 is a partial back view of one quadrant of the mounting base plate disclosing a rotatable threaded position shaft.
Figure 4:
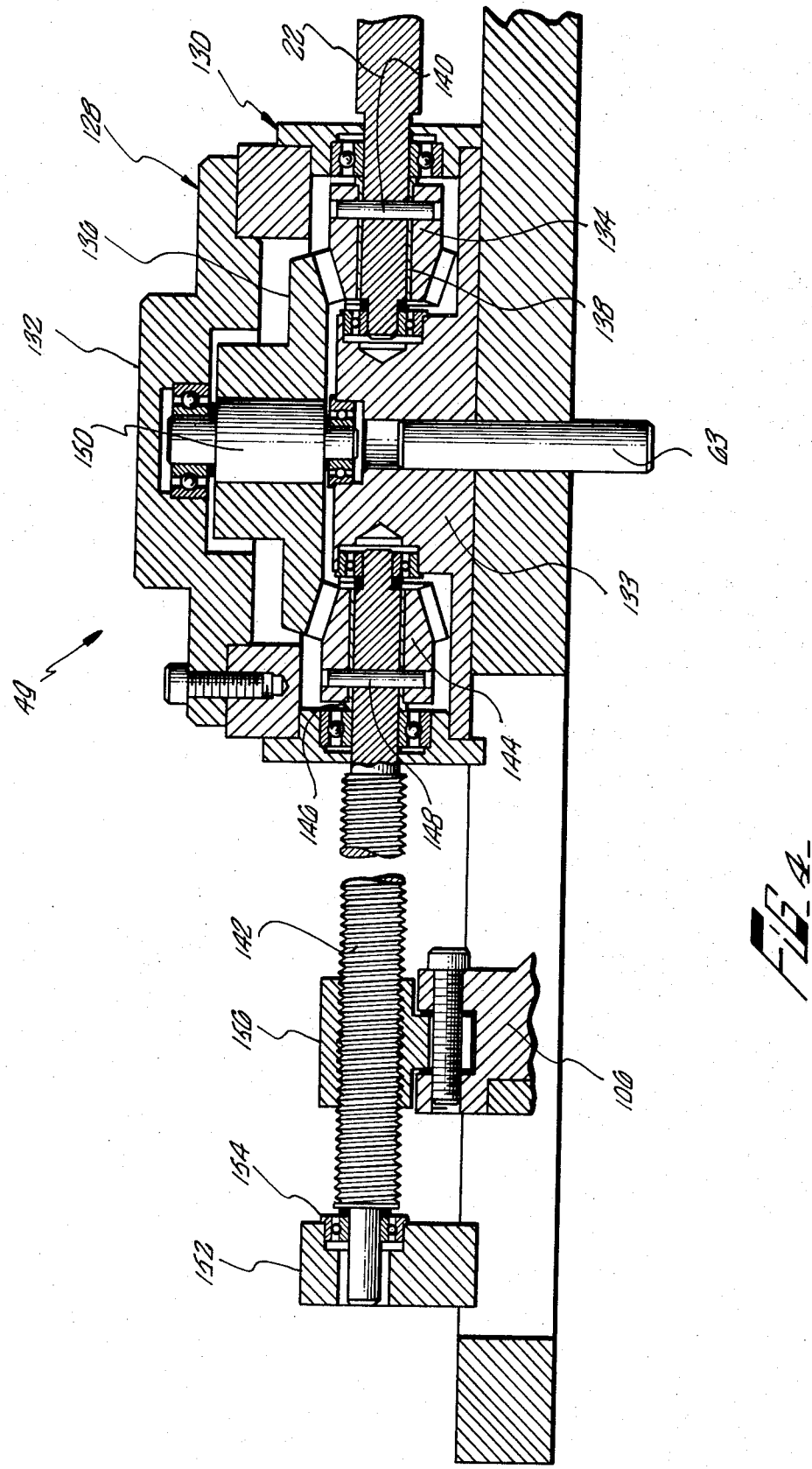
FIG. 4 is a cross sectional view of the positional gear assembly.

Referring to FIGS. 2 and 4, the means for positioning the roller assembly 16 is disclosed as a positioning assembly 49. The positioning power shaft 22 from the speed reduction gear box 24 extends into an outer housing 128 which comprises essentially a series of side cover plates 130 and a top cover plate 132 appropriately fastened together.

The positioning power shaft 22 is appropriately connected to a bevel gear 134 which drives a main power bevel gear 136. The bevel gear 134 is appropriately connected to the positioning power shaft 22 through a sleeve adapter member 138 with a locking pin 140. The sleeve adapter 138 can be eliminated by increasing the size of the power shaft 22. Appropriate bearings and spacers functioning in the same manner as disclosed with regard to FIG. 3 are utilized in mounting the bevel gear 134.

Radiating outward from the power bevel gear 136 are four threaded shafts which are designed to position the respective roller assemblies 16. As with the rotational drive assembly 48, the positioning assembly 49 which includes the threaded shaft 142 is identical for each quadrant, and accordingly, only one positioning means will be described. The positioning threaded shaft 142 has a bevel gear 144 that is mounted on the shaft 142 by an adapter sleeve 146 and a locking pin 148. Appropriate spacers and bearings are utilized with the shaft 142 and the bevel gear 144 as disclosed before. Likewise, the power bevel gear 136 is appropriately mounted by a press fit on a shaft 150 similar to the drive bevel gear 64 described in FIG. 3. A mounting member 133 is mounted on the dowel pin 63 and provides appropriate seats for the bearings associated with the respective shafts as shown in FIG. 4. The power bevel gear 136 drives a number of secondary bevel gears such as the bevel gear 144 for the subsequent driving of the other positioning shafts. A mounting bracket 152 supports one end of the threaded shaft 142 through a bearing 154.

Journaled on the threaded shaft 142 is a threaded coupling member 156 which in turn is rigidly connected to the outer housing 106 of the roller assembly 16. Depending upon the rotational direction of the threaded shaft 142, the coupling member 156 and accordingly, its connected roller assembly 16 will be moved longitudinally along the threaded shaft 142 to the desired position for the roller 18. Thus, in accordance with the positioning means described herein the roller assembly 16 with its respective roller 18 can be accurately positioned along the longitudinal length of the tracks 14. While not specifically disclosed in FIG. 1, it should be understood that the roller assembly 16 is provided with rails, not shown, which are journaled within the respective tracks 14 for maintaining a precise stable position of the roller assembly 16.

As can be seen in FIGS. 1 and 3, the belt blank 7 which in this example is an uncrystallized polyester is initially placed loosely over the rollers 18 and 19 which have been appropriately positioned by the positioning assembly 49. A programmed heating of the belt blank 7 begins while the rollers 18 and 19 rotate the belt blank 7, for example, at 50 rpm. Heating the blank 7 to a temperature between 70°C and 90°C relaxes any internal stresses causing the belt blank 7 to shrink to a belt shape with a resultant increase in thickness. The temperature of the belt is increased to a predetermined value, which is the temperature wherein the belt will achieve the desired programmed thickness and width. Generally, the length of the belt is the circumference of the inside edge of the blank 7. Rotation of the belt blank 7 continues at the predetermined temperature until all internal tensions have been dissipated. The belt blank 7 is then heated to approximately 185°C in order to crystallize and stabilize its thermal and physical properties and then subsequently it is cooled to ambient temperature.

The finished belt will have a uniform width that will not require any trimming of the edges. It will further have a true cylindrical shape with stable dimensions. The finished belt can be made in greater widths, for the same length than was previously possible. It will be less susceptible to delamination and will have a longer life span than previous prior art belts.

It should be realized that the belt blank 7 could be of a number of different sizes and that three or even all four rollers 18 could be utilized to rotate a large belt blank. In addition, it is possible to extend the rollers 18 radially outward to physically stretch the belt blank 7 as it is being rotated.

Referring to FIG. 5, the speed reduction gear assembly 24 is shown in cross section and will be briefly described with respect to the DC positioning motor 28 and its transmission of power to the positioning shaft 22. An output shaft 158 from the DC motor 28 is connected to a drive gear 160 which in turn intermeshes with a secondary gear 162. The secondary gear 162 is mounted on the stepped shaft 164 that is appropriately mounted within bearings fastened to the walls of the housing of the gear box. A pinion gear 166 is also mounted on the shaft 164 and intermeshes with a spoke gear 168. A secondary pinion gear 170 is mounted on the same shaft 172 as the spoke gear 168. The shaft 172 is appropriately mounted for rotation between the walls of the housing and the pinion gear 170 drives a speed reducing gear 174 which in turn meshes with the drive gear 176 mounted on the output positioning shaft 22.

A similar speed reducing gear assembly is connected between the DC motor 26 and the rotational output shaft 20 and accordingly, will not be described herein.

The rotational shaft 22 as described before includes an extension threaded shaft 36 which positions the pointer block 38 to indicate the position of the rollers 18. Generally the housing and support plates of the present invention will be made from aluminum.

As can be appreciated by those skilled in the art, other means of driving and positioning the rollers 18 can be utilized and accordingly, the scope of the present invention should be determined solely from the following claims.

While a preferred embodiment of the present invention has been described hereinabove, it is intended that all matter contained in the above description and shown in the accompanying drawings be interpreted as illustrative and not in a limiting sense and that all modifications, constructions, and arrangements which fall within the scope and spirit of the invention may be made.

What is claimed is:

1. Apparatus for forming drive belts from plastic belt blanks comprising:
   a housing member;
   a plurality of rollers rotatably mounted in the housing member;
   means for applying heat to the plastic belt blank while it is in the housing member;
   means for moving at least two rollers relative to the housing member to predetermined positions within the housing member, and means for rotating the rollers wherein the belt blank can be positioned on the rollers and formed into a drive belt as it is rotated.

2. The invention of claim 1 wherein the means for moving at least two rollers includes a motor outside the housing member and a positional drive shaft driven by the motor and extending into the housing member.

3. The invention of claim 1 wherein the means for moving at least two rollers includes a threaded shaft for each roller operatively connected respectively to the drive shaft and the roller.

4. The invention of claim 1 wherein the means for rotating the rollers includes at least one shaft having a longitudinal slot for operatively rotating a roller as it is moved along the slotted shaft.

5. The invention of claim 1 wherein the rollers have substantially an open hollow cylinder shape.

6. The invention of claim 1 further including a rotatable relatively fixed roller centrally positioned and relatively closer to one movable roller than the other.

7. The invention of claim 1 further including a speed reduction gear assembly operatively connected to the means of moving and the means for rotating the rollers.

8. The invention of claim 1 further including measuring means connected to the means for moving the rollers for indicating the position of the rollers.

9. The invention of claim 1 wherein the rollers have a central cylindrical shape of constant diameter joined by tapered sides.

10. The invention of claim 2 wherein the means for rotating the roller includes a second motor outside the housing member and a rotational drive shaft driven by the second motor and extending into the housing member.

11. The invention of claim 3 wherein the means for moving includes a drive bevel gear operatively connected to the drive shaft and the threaded shaft of each roller.

12. The invention of claim 4 wherein the means for rotating further includes a key and a gear, the key operatively slidable in the longitudinal slot of the shaft and connected to the gear for rotating the gear with the shaft.

13. The invention of claim 8 wherein the measuring means further includes a threaded shaft having a journaled pointer member and a cooperative reference indicator.

14. The invention of claim 10 wherein four rollers and respective diagonal tracks are provided, each roller mounted on a roller assembly, the roller assembly connected to and movable along a respective track.

15. The invention of claim 13 further including a secondary measuring device having a measuring rod operatively contacting the pointer member and connected to an output gauge indicator.

* * * * *